(12) United States Patent
Lin et al.

(10) Patent No.: US 7,822,127 B1
(45) Date of Patent: Oct. 26, 2010

(54) METHOD AND APPARATUS FOR MINIMIZING SIGNAL LOSS IN TRANSIT

(75) Inventors: Ben-Koon Lin, Fremont, CA (US); Charles J. Liang, Fremont, CA (US)

(73) Assignee: Super Micro Computer, Inc., San Jose, CA (US)

( * ) Notice: Subject to any disclaimer, the term of this patent is extended or adjusted under 35 U.S.C. 154(b) by 745 days.

(21) Appl. No.: 11/383,377

(22) Filed: May 15, 2006

(51) Int. Cl.
*H04L 27/00* (2006.01)

(52) U.S. Cl. .......... 375/259; 341/61; 709/230; 709/231; 709/203; 370/545; 370/391; 327/113

(58) Field of Classification Search ......... 370/359, 370/362, 365, 395.5, 232, 234, 545, 391, 370/385, 914; 341/113; 327/61; 709/230, 709/231, 233, 219, 203; 375/259, 278, 355
See application file for complete search history.

(56) References Cited

U.S. PATENT DOCUMENTS

| | | | |
|---|---|---|---|
| 6,453,374 B1 * | 9/2002 | Kovalan et al. ............ 710/100 |
| 7,519,057 B2 * | 4/2009 | Lund et al. ................. 370/389 |
| 7,525,957 B2 * | 4/2009 | Scherer et al. .............. 370/360 |
| 2005/0089126 A1 * | 4/2005 | Zerbe et al. ................ 375/353 |
| 2005/0139391 A1 * | 6/2005 | Li et al. ..................... 174/262 |
| 2006/0203830 A1 * | 9/2006 | Doi ............................ 370/401 |
| 2007/0047536 A1 * | 3/2007 | Scherer et al. .............. 370/360 |
| 2007/0099455 A1 * | 5/2007 | Rothermel et al. ......... 439/108 |

* cited by examiner

*Primary Examiner*—David C Payne
*Assistant Examiner*—Rahel Guarino
(74) *Attorney, Agent, or Firm*—Joe Zheng; Wuxi Sino IP Agency, Ltd.

(57) ABSTRACT

Techniques for minimizing signal loss in transit are described. Data signals lose their strengths while traveling across conductive passages such as cooper wire, cooper strip, Printed Circuit Board (PCB), etc. There are two major factors that affect the signal loss: the distance and the speed. To minimize signal loss while maintaining higher rate data signals for I/O, substantially lower rate data signals are used in transit between two interfaces over a signal path.

13 Claims, 6 Drawing Sheets

250

METHOD AND APPARATUS FOR MINIMIZING SIGNAL LOSS IN TRANSIT

BACKGROUND

1. Field of the Invention

The present invention generally relates to the area of computer systems, more particularly to method and apparatus for minimizing signal loss in transit.

2. Description of the Related Art

Faster and better performance has been always the driving force in the computer industry. One of the famous observations was made by Gordon Moore, co-founder of Intel. It is known as the Moore's law, which cites that the number of transistors per square inch on integrated circuits had doubled every 18 months. Although Moore's Law became known as the limit for the number of transistors on the most complex chips, it is also common to cite Moore's law to refer to the rapidly continuing advance in computing power per unit cost. Similar laws have been held true for other computer system components, such as hard disk and memory capacities, network communication speeds, internal computer bus speeds, and etc.

Many of today's computer systems are connected together to form a server farm or a cluster to handle the ever increasing demands. As the processor speed has increased many folds in the past decades, the bottleneck is the speed of the network interconnecting servers. The solution is to use a faster network such as InfiniBand technology, which allows up to 20 Gbits/sec throughput of data flow between processors and I/O devices. The InfiniBand technology can be used to connect servers with remote storage and networking devices, and other servers, and/or it can also be used inside servers for inter-processor communication in parallel computing clusters. However, owing to very fast speed, data signals become much more difficult to detect when moving from one point to the next. As a result, the data signals are lost at the receiving end and rendered useless. Therefore, it would be desirable to provide a mechanism to minimize signal loss between two data communication ends.

SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

The present invention discloses a method and apparatus for minimizing signal loss in transit. Data signals lose strength while traveling through conductive passage such as cooper wire, cooper strip, Printed Circuit Board (PCB), etc. There are two major factors that affect the signal loss: distance and speed of the data signals. To minimize signal loss while maintaining higher rate data signals for I/O, lower rate data signals are used in transit between two interfaces over a signal path. Experimental data show that the signal loss can be reduced from more than 50% to about 10%, if lower rate date signals are used. When the present invention embodying in a blade server, at least one I/O module is configured to higher rate data signals (e.g., 20 Gbits/sec based on Infiniband), a plurality of blades is configured to lower rate data signals (e.g., 2.5 Gbits/sec based on PCI-Express), and the signal path is a PCB midplane.

According to one embodiment, the present invention is a method for minimizing signal loss in transit, the method includes at least the following: receiving data signals at a first rate at a first end; transmitting the data signals at the first rate to a second end over a signal path; and converting the data signals to a second rate at the second end, wherein the second rate is substantially higher than the first rate such that the signal loss is minimized in transit over the signal path.

According to another embodiment, the present invention is an apparatus for minimizing signal loss in transit, the apparatus includes at least the following: a plurality of first interfaces, each transmitting data signals at a first rate in accordance with a first protocol; at least one I/O module including a data rate converter and a second interface for transmitting data signals at a second rate in accordance with a second protocol; a switching means; and a plurality of signal paths coupled between the first interfaces and the data rate converter in the at least one I/O module, wherein the switching means is configured to ensure that none or one of the first interfaces is coupled to the data rate converter at any time, and wherein the data rate converter is configured to convert the data signals from the first rate to the second rate or from the second rate to the first rate such that the data signals always transmit at the first rate over a signal path between one of the first interfaces and the switching means.

One of the objects, features, and advantages of the present invention is to maintain a high bandwidth communication with minimal data signal loss in transit.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be become better understood with regard to the following description, appended claims, and accompanying drawings where:

DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention does not inherently indicate any particular order nor imply any limitations in the invention.

Embodiments of the present invention are discussed herein with reference to FIGS. 1A-3. However, those skilled in the art will readily appreciate that the detailed description given herein with respect to these figures is for explanatory purposes as the invention extends beyond these limited embodiments.

Figure 1A:
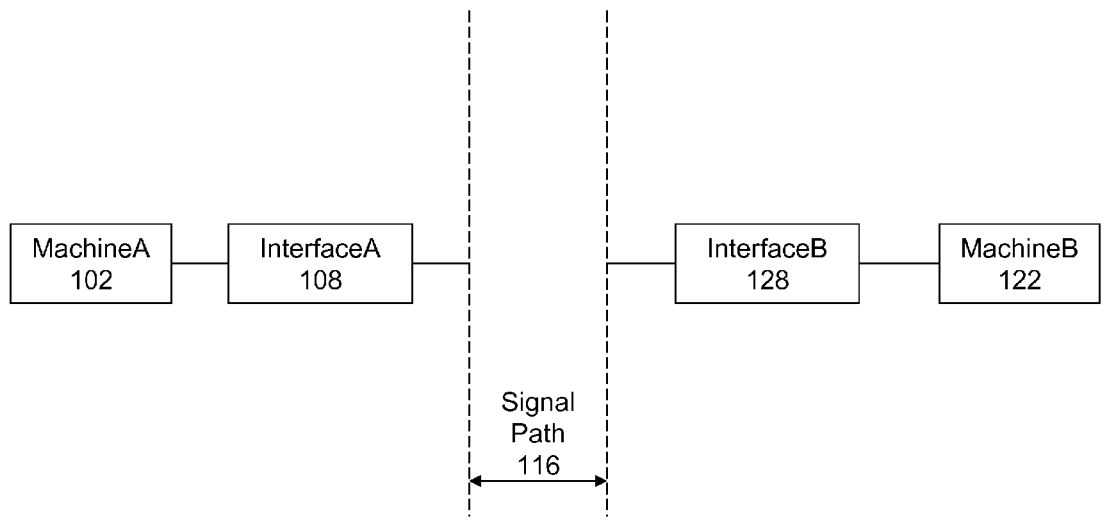
FIG. 1A is a diagram depicting a data signal path between two computing machines.

FIG. 1A is a diagram 100 depicting a data signal path between two computing machines. The diagram 100 shows that data signals are transmitted between MachineA 102 and MachineB 122 through InterfaceA 108 and InterfaceB 128 over a signal path 116. MachineA 102 and MachineB 122 are computing machines that can facilitate the data communication between each other. InterfaceA 108 and InterfaceB 128 are the communication interfaces closely coupled to MachineA 102 and MachineB 122, respectively. In general, a communication or network interface is coupled onto each of the computer machines. The data signals are transmitted in accordance with a protocol that both interfaces have agreed upon and hence can communicate with each other. The exemplary protocols may include, but not be limited to, Peripheral Component Interconnect (PCI), PCI Express (PCI-E), Infiniband, and alike. The communication interface may be provided on a motherboard or an add-on daughter board in a computing machine. The signal path 116 represents a date communication link between two interfaces. In one embodiment, the signal path 116 is one or more copper strip conductors. In another embodiment, the signal path 116 is one or more conductive passages within a Printed Circuit Board (PCB).

Figure 1B:
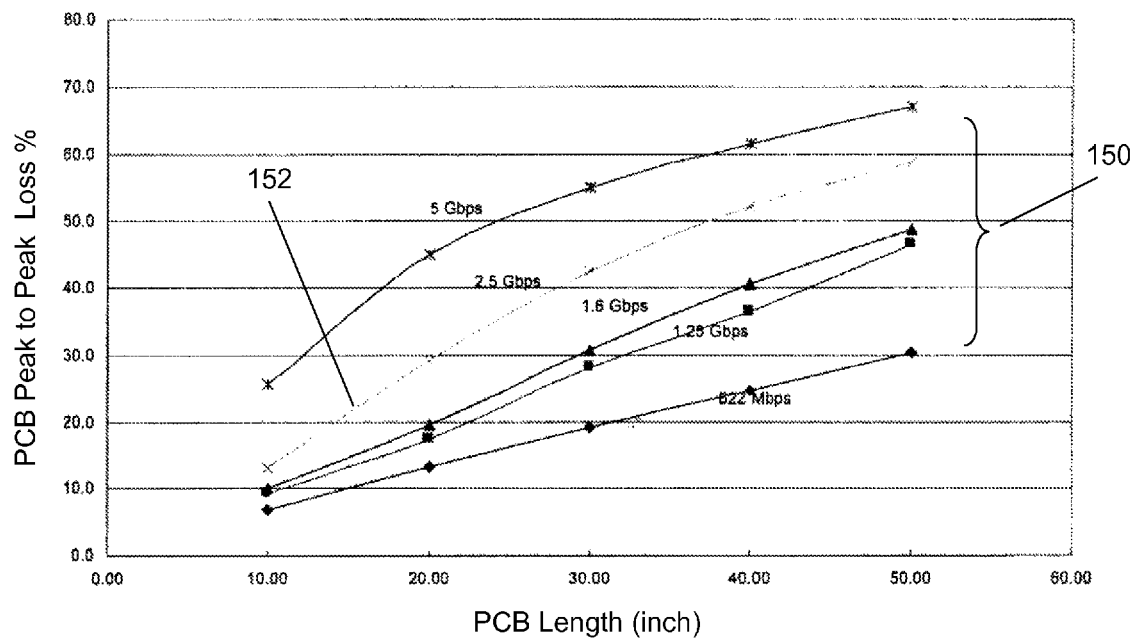
FIGS. 1B and 1C show the experimental data of signal loss of data signals transmitted in a conductive passage.
Figure 1C:
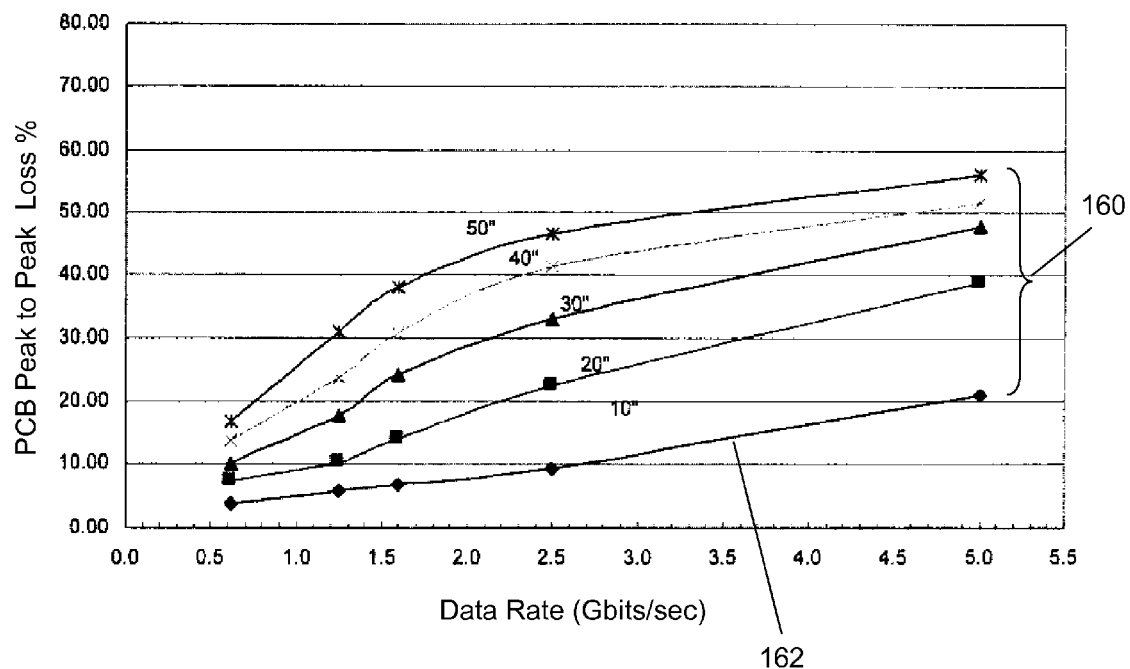

Data signals lose their strengths while the data signals are traveling through the conductive passages such as cooper wires, copper strips, and/or PCBs. There are two major factors that cause the signal loss: the distance and the speed. FIGS. 1B and 1C show a couple of exemplary experimental data of signal loss of the data signals transmitting in a conductive passage of a PCB. FIG. 1B is a plot of 100 ohm differential PCB percentage peak to peak loss (i.e., the values in the vertical axis) versus the length of the cooper passage in a PCB in inches (i.e., the values in horizontal axis). This exemplary experimental data is conducted on a FR-4 PCB with 4-mil line width passage. A family of curves 150 is plotted for various data signal speeds: 0.622, 1.25, 1.6, 2.5 and 5 Gbits/sec. in FIG. 1B. FIG. 1C is a plot of 100 ohm differential PCB percentage peak to peak loss (i.e., the values in the vertical axis) versus the data signal rate in Gbits/sec (i.e., the values in the horizontal axis). Instead of the 4-mil line width, an 8-mil line width is used for experimental data as shown in FIG. 1C. A plurality of curves 160 is presented for a range of passage lengths: 10, 20, 30, 40 and 50 inches. It is clearly indicated from the experimental results that the signal loss is higher when the data signals travel a longer distance, and the signal loss is higher when the data signals travel faster. For example, as far as the 2.5 Gbits/sec data rate curve 152 of FIG. 1B is concerned, the signal loss is about 10% at a distance of 10-inch and more than 50% at 50-inch. For another example, the 10-inch distance curve 162 of FIG. 1C, the signal loss is below 10% at speed below 2.5 Gbits/sec while the signal loss is more than 20% at 5 Gbits/sec.

Figure 2A:
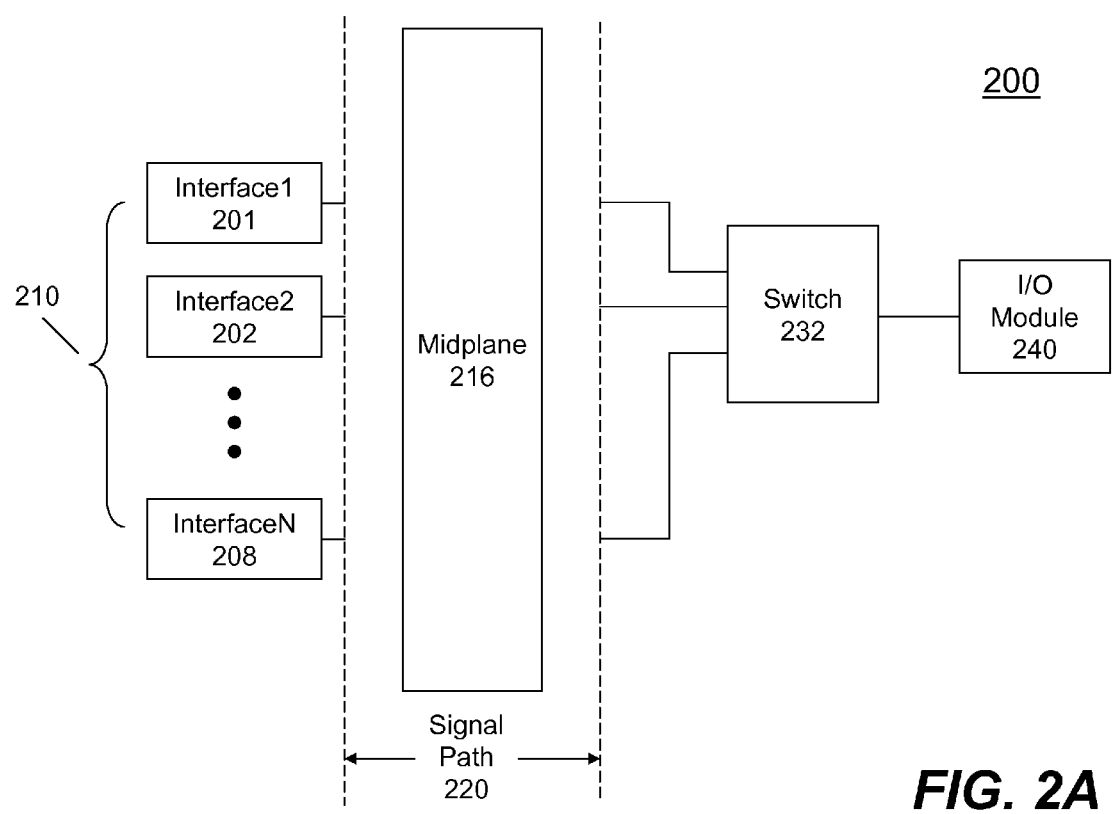
FIG. 2A shows a diagram of data signal path between a plurality of interfaces and an I/O module via a switch in accordance with one embodiment of the present invention.

FIG. 2A shows a diagram 200 of data signal path between a plurality of interfaces 210 and an I/O module 240 via a switch 232 in accordance with one embodiment of the present invention. In one embodiment, the data signal path is within a blade server that includes a plurality of blades. Each of the blades is a minimal configured computer (e.g., a motherboard with processor, memory, and network interface), which corresponds to a computing machine (e.g., MachineA 102 or MachineB 122 of FIG. 1A). Data signals are exchanged between any one or more of interfaces 210 (i.e., Interface1 201, Interface2 202, . . . . InterfaceN 208) and the I/O module 240 via the switch 232. Between the interfaces 210 and the switch 232 there is a signal path 220 that may range from 2 inches to 50 inches. Besides the conductive passages, the signal path 220 includes a midplane 216 (i.e., a PCB) that allows the data to go through. The switch 232 (e.g., a multiplexer) is placed in front of the I/O module 240 so that the data signals transmitted from the plurality of the interfaces 210 can be properly redirected to the I/O module 240, the same holds true when data signals are transmitted from the I/O module 240 to one of the interfaces 210. In other words, the plurality of the interfaces 210 shares one I/O module 240. To achieve higher performance, the I/O module 240 is configured to provide high data signal rate (e.g., 20 Gbits/sec based on the Infiniband technology). However, the data signal rate in the plurality of interfaces 210 is generally transmitted in a lower rate (e.g., 2.5 Gbits/sec based on PCI-E). Therefore, it is required to convert the data signal from a lower rate to a higher rate or vice versa. One of the keys features, advantages and benefits in the present invention is to convert the data signal to a rate that has the least signal loss.

Figure 2B:
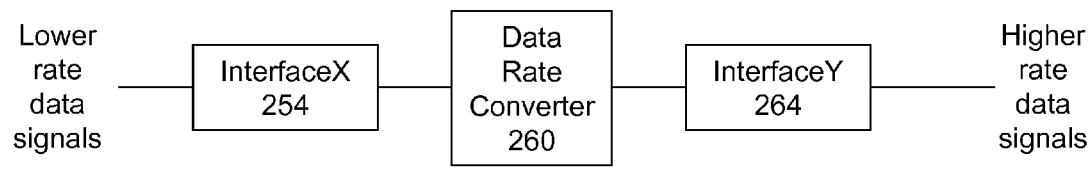
FIG. 2B is a function block diagram showing conversion of data signals from a lower rate to a higher rate in accordance with one embodiment of the present invention.

FIG. 2B is a function block diagram 250 showing a conversion of data signals from a lower rate to a higher rate in accordance with one embodiment of the present invention. The lower rate data signals are coupled to InterfaceX 254 (e.g., Interface) 201, Interface2 202, . . . . InterfaceN 208 of FIG. 2A). Then the lower rate data signals are converted into higher rate data signals in a data rate converter 260 before being transmitted to InterfaceY 264 (e.g., I/O module 240 of FIG. 2A) which communicates to other devices accommodating the higher rate data signals. In a reverse direction, the data rate converter 260 converts the higher rate data signals from InterfaceY 264 to the lower rate data signals before the data signals are transmitted to InterfaceX 254.

Using the configuration of FIG. 2A as an example, if lower rate data signals (e.g., 2.5 Gbits/sec) are converted in the data rate converter 260 placed next to the plurality of the interfaces 210, the resulting substantially higher rate data signals (e.g., 20 Gbits/sec) have to travel through the signal path 220 before reaching the switch 232 and the I/O module 240. At 20 Gbits/sec, a significant percentage (e.g., 60-70%) of the data signals would be lost even the data signals only travels through a few inches of the PCB passage based on the experimental data displayed in FIGS. 1B and 1C. In order to avoid losing the data signals, the data rater converter 260 is preferably placed right next to the I/O module 240 in accordance with one embodiment. When the data signals travel through the signal path 220 with a relative lower speed of 2.5 Gbits/sec, the signal loss may be limited to about 10%.

In one embodiment, the present invention is deployed in a blade server. A blade server essentially houses a number of individual minimally-packaged computer motherboard "blades", each including one or more processors, computer memory, computer storage, and computer network connections, but sharing the common power supply and cooling resources of the chassis. The idea is that by placing many blades in a single chassis, and then 19-inch rack-mounting them, systems can be more compact and powerful, but less expensive than traditional systems based on mainframes, or server farms of individual computers.

Figure 3:
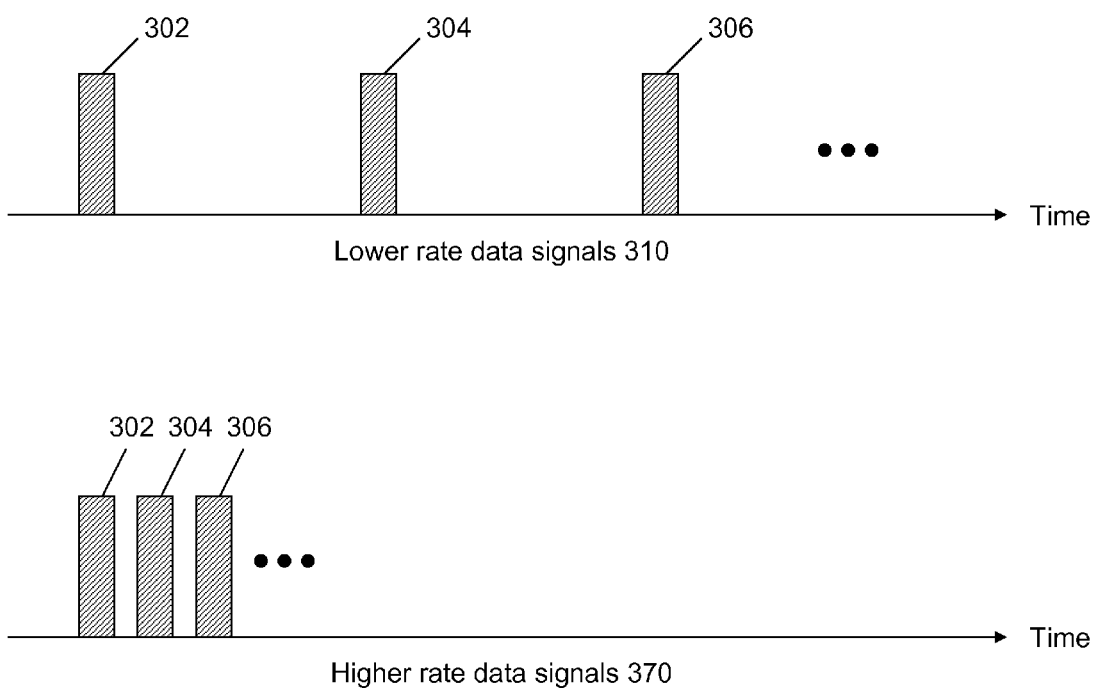
FIG. 3 shows an exemplary data rate conversion scheme in accordance with one embodiment of the present invention.

FIG. 3 shows an exemplary data rate conversion scheme in accordance with one embodiment of the present invention. Depending on the transmission direction of data signals, the data rate converter 260 of FIG. 2B can either convert lower rate data signals 310 to higher rate data signals 370, or convert higher rate data signals 370 to lower rate data signals 310. The lower rate data signals 310 include data signals 302, 304, 306, etc. After the conversion, the higher rate data signals 370 will include these data signals 302, 304, and 306 in a much closer spacing in time. In one embodiment, the lower rate data signals 310 are transmitted with the speed according to the PCI-E standard at 2.5 Gbits/sec. The higher rate data signals 370 are transmitted at the speed in accordance with the Infiniband standard (at 20 Gbits/sec.). Although only the PCI-E and Infiniband standards are described in the specification, the present invention is not limited to these two standards. Those skilled in the art will appreciate that other data transmission standards can be applied to the present invention as well.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. A method for minimizing signal loss in transit over a printed circuit board (PCB) midplane in a blade server, the method comprising:
   receiving a plurality of data signals at a predefined first rate at a first end of the PCB midplane;
   transmitting the data signals at the first rate from the first end of the PCB midplane to a second end over the PCB midplane;
   selecting one of the data signals by a switch; and
   converting at the second end the one of the data signals by a data rate converter to a predefined second rate before the one of the data signals reaches an I/O module, wherein the second rate is substantially higher than the first rate such that the one of the data signals is transmitted at a much higher speed within the blade server while the signal loss is minimized in transit over the midplane in the blade server.

2. The method as recited in claim 1, wherein the first end includes a plurality of interfaces receiving the data signals in accordance with a first protocol.

3. The method as recited in claim 2, wherein the first protocol is PCI-E.

4. The method as recited in claim 2, wherein the second end includes the switch that continues transmission of the one of the data signals in accordance with a second protocol.

5. The method as recited in claim 4, wherein the second protocol is Infiniband.

6. The method as recited in claim 1, wherein the midplane includes one or more conductive passages guiding the data signals from the first end to the second end, the conductive passages having inherent characteristics of causing higher signal loss when the data signals are transmitted at second rate.

7. The method as recited in claim 1, further comprising:
   receiving a data signal at the second rate at the second end;
   converting the data signal at the second rate to the first rate at the second end; and
   transmitting the data signal at the first rate via the switch to a destination via the midplane.

8. The method as recited in claim 1, wherein the first end includes a plurality of blades in the blade server and the second end is the switch coupled to the I/O module of the blade server.

9. A blade server with a capability of minimizing signal loss in transit, the blade server comprising:
   a plurality of first interfaces, transmitting a plurality of data signals at a predefined first rate from a first end in accordance with a first protocol over a midplane to a second end in the blade server;
   a switching means including a data converter, in the second end, coupled to the midplane and receiving the data signals, selecting one of the data signals to be converted from the first rate to a predefined second rate; and
   an I/O module to receive the one of the data signals at the second rate, wherein the second rate is substantially higher than the first rate such that the one of the data signals is transmitted within the blade server at a much higher speed while the signal loss is minimized in transit over the midplane in the blade server.

10. The blade server as recited in claim 9, wherein each of the first interfaces is from one of blade computers in the blade server.

11. The blade server as recited in claim 9, wherein each of the first interfaces is a network interface on one of a plurality of blade computers of the blade server.

12. The blade server as recited in claim 11, wherein the blade server includes the plurality of blade computers coupled to a printed circuit board (PCB) midplane on one side and the one I/O module on other side.

13. The blade server as recited in claim 12, wherein the I/O module includes a pair of identical I/O modules for ensuring reliability of the blade server with redundancy.

* * * * *